(12) United States Patent
Lezdey

(10) Patent No.: US 7,828,885 B1
(45) Date of Patent: Nov. 9, 2010

(54) ANTI-MICROBIAL COMPOSITIONS AND POLYMERS

(75) Inventor: John Lezdey, Indian Rocks Beach, FL (US)

(73) Assignee: World-Pharm Trust, Largo, FL (US)

( * ) Notice: Subject to any disclaimer, the term of this patent is extended or adjusted under 35 U.S.C. 154(b) by 193 days.

(21) Appl. No.: 12/009,222

(22) Filed: Jan. 17, 2008

(51) Int. Cl.
| | |
|---|---|
| *C04B 9/02* | (2006.01) |
| *C09D 4/00* | (2006.01) |
| *C09D 9/00* | (2006.01) |
| *C11D 3/30* | (2006.01) |
| *A61K 6/083* | (2006.01) |
| *C08L 67/02* | (2006.01) |

(52) U.S. Cl. ............. 106/14.34; 106/14.27; 106/169.5; 106/200.4; 510/210; 510/212; 510/241; 523/105; 525/32

(58) Field of Classification Search ................. None
See application file for complete search history.

(56) References Cited

U.S. PATENT DOCUMENTS

| | | | | |
|---|---|---|---|---|
| 4,542,146 | A | * 9/1985 | Van Gestel et al. | 514/383 |
| 5,965,651 | A | * 10/1999 | Ishii et al. | 524/388 |
| 2002/0168422 | A1 | * 11/2002 | Hei et al. | 424/661 |

* cited by examiner

*Primary Examiner*—Shanon A Foley
(74) *Attorney, Agent, or Firm*—John Lezdey

(57) ABSTRACT

Anti-microbial compositions, polymers and paints having incorporated therein at least one phenolic complex. Preferably a chloroxylenol complex is utilized for topical treatment of a patient with a bacterial or viral skin infection.

7 Claims, No Drawings

ANTI-MICROBIAL COMPOSITIONS AND POLYMERS

FIELD OF THE INVENTION

The present invention relates to antimicrobial compositions including polymers and paints. More particularly, there is provided compositions and polymeric products having incorporated therein phenolic complexes and/or anti-microbial amines.

BACKGROUND OF THE INVENTION

Anti-microbial sprays are well known. However, conventional sprays are topically applied and have a limited life especially when diluted with water or alcohol. Furthermore, many of the anti-microbial compositions cannot be utilized in the processing of polymeric materials since the physical characteristics of the polymers can be altered. This result is a lowering in the degree of utility of the polymer for the desired activity. It is well known that the addition of polymer additives can materially affect the physical characteristics of a polymer.

Phenols are recognized to be the standard for testing as to the anti-microbial characteristics of an anti-microbial agent. Quaternary ammonium compounds are primarily utilized against gram negative bacteria. Quaternary compounds are utilized for surface sanitation in the form of topical sprays.

It is desirable to incorporate anti-microbial compositions into polymers to prevent degradation if the physical characteristics of the polymers are not altered.

While the state of anti-bacterial films has evolved, there is limited versatility and variability for anti-microbial products currently available as coatings and paints which can be used. Incorporation of an antimicrobial agent into a part depends upon the stability of the anti-microbial agent at the temperature that the part is formed. Also, in porous parts such as foam, the conventional anti-microbial agent is subject to being leached out.

Ethyl vinyl alcohol and Ethyl vinyl acetate are mechanically tough thermoplastics that readily and stably polymerizes without low molecular weight contaminants or chemical stabilizers. KYNAR® brand PVDF homopolymers and copolymers is commercially available from Elf Atochem ATO, Philadelphia, Pa. PVDF can be utilized to provide a sprayable or paintable coating having incorporated an anti-microbial agent which can be used as a bandage.

Each of U.S. Pat. Nos. 4,554,293; 4,528,300; and 4,640,933, which are herein incorporated by reference, disclose processes for the preparation of polyolefin resin foams which can be used in the present invention.

SUMMARY OF THE INVENTION

The present invention relates to anti-microbial compositions and to polymeric substrates including cellulosic substrates having the antimicrobial compositions incorporated in their structure.

The antimicrobial composition comprises;
a) about 1 to 20% by weight of a chloroxylenol complex and an antimicrobial amine compound and a dicarboxylic acid having 2 to 8 carbon atoms, and
b) a suitable solvent, Preferably, the phenol complex ix chloroxylenol and the dicarboxylic acid is succinic acid.

The phenolic compositions are either incorporated into the polymeric part or form a surface barrier film by themselves or in combination with a polymer.

It is therefore an object of the resent invention to provide polymers having antimicrobial inhibiting activity for use in connection with polymeric items including paint and coatings.

It is another object of the invention to provide microbial inhibition to surface coatings.

It is still another object to provide filters having antimicrobial activity.

It is yet another object of the invention to provide a deodorizer for polymeric parts subject to mold and bacterial causing odors.

It is a further object of the invention to prevent the growth of black mold on wood.

It is also an object to provide a topical antimicrobial composition for treating patients infected with viruses and bacterial infections on the skin.

DESCRIPTION OF THE PREFERRED EMBODIMENTS

The present invention relates to antimicrobial and mold and mildew inhibiting polymer substrates and coatings. More particularly there is provided sprays, coatings and polymers which resist degradation and odors caused by bacteria or mold.

According to one embodiment of the invention, the antimicrobial agent which is incorporated into a polymer or utilized in connection with polymeric substrates comprises a phenolic compound, for example, chloroxylenol which has been complexed with a dicarboxylic acid and/or an antibacterial amine or diamine compound. The anti-microbial composition is used alone or combined with a suitable polymer and incorporated into or on a part to provide a surface which inhibits the growth of bacteria, mold and/or mildew.

The compounds include N,N,N,$N^1$, $N^1$-pentamethyl-$N^1$-tallow alkyl-1,3-propanamine diammonium chloride; N-tallow alkyl-1,3-propanamino diammonium chloride; N-tallow pentamethyl propane diammonium chloride; 1,3-propanediamine, N-9-octadecenyl, oleyl 1,3-propylene diamine (ADOGEN 572®); methyltrialkyl amine, ADOGEN 582® an antimicrobial diamine and the like.

Preferred biocidal amines can be obtained from Degussa Corp. in the product sold in the ADOGEN® series which are antimicrobial diquaternary ammonium compounds.

The polymers which are used in combination with the antimicrobial components include compounds selected from the group consisting of polyolefin, PVDF, acrylic, EVA, EVOH, polyurethane and epoxy. The acrylic polymers can comprise monomers selected from the group consisting of lower mono and di-alkyl acrylate, lower alkyl methacrylate, acrylic polymers and the like. Acrylic polymers such as found in latex paints for interior or exterior use are preferred.

For coating compositions for long term use, it is preferred to use an aqueous emulsion, an acrylamide, polyurethane or latex.

Epoxy resins are suitable to make anti-microbial paints, coatings and parts for oil pipes, marine parts including ship hulls and docks.

Preferred phenolic spray compositions used in the present invention include those formed by admixing the following ingredients:

| Ingredient | % Wt. |
| --- | --- |
| Phenol | 0-5 |
| Chloroxylenol | 0.5-10.0 |
| Dicarboxylic acid | 0.5-5.0 |
| Anti-microbial ammonium compound | 0-5.0 |
| Solvent | q.s. |

When the composition is for use on bacterial or fungal infection on a patient, ethanol or glycerol is preferred.

The compositions can be mixed with about 2-10% of a polymer so as to form an antimicrobial film when dried or cured. When sprayed onto a substrate or used in connection with an open cell polymer, dipping or spraying the polymer provides binding power.

The dicarboxylic acid contains 2-6 carbon atoms and forms a complex with the phenolic compound. The ammonium compounds are antimicrobial and also form complexes with the phenols.

The preferred solvents are water and a lower alkanol such as methanol, ethanol and isopropanol, vegetable oil, PEG, mineral oil, 1,4-butanediol and the like depending upon the use of the composition for non-medical treatment.

The polymers which can be used include polyolefins such as polyethylene, ethylene vinyl acetate, ethylene ethyl acrylate, polypropylene and copolymers thereof, polyvinylalcohol, acrylic polymers such as polyacrylonitrile based polymers, polystyrene, polyamides polyurethane, ethylvinylalcohol, epoxy resins and EVA.

The polyolefin materials which are advantageously used in preparing the products of the invention are selected from the group consisting of polyethylene homopolymers, polypropylene homopolymers, polyethylene copolymers, polypropylene copolymers, polyethylene terpolymers and polypropylene terpolymers of or making antimicrobial turf for football fields.

Various additives or modifying agents such as stabilizers, pigments, dyes, filters, chemical blowing agents, inhibitors chain transfer agents, nucleating agents inter alia may be added to the polymers.

Conventional pigments in addition to the antimicrobial compositions may be added to the system either at the precursor formation stage or at the final curing stage by conventional means. For foam products, chemical blowing agents such as hydrocarbons ($C_3$-$C_4$) having high vapor pressure, i.e. propane, butane, isobutene and chlorofluorocarbons, nucleating agents such as talc and fatty acids which provide control of cell nucleation and dimensional stability may be generally added to the polymer or cured polymer together with the antimicrobial agents before or after a shaping or forming step.

The antimicrobial polymers of the invention can be used as coatings or incorporated into polymeric used in hospitals, paints, coatings and parts, for example, filters, shower curtains, sound deadeners, upholstering, floor mats, cushions, etc and medical gloves.

A composition for incorporating into a polymer comprises:

| Ingredient | Wt. % |
| --- | --- |
| Phenolic complex | 1-20% |
| Solvent | qs. |

The phenolic complex comprises the reaction product of a phenol compound and the antimicrobial amine and/or dicarboxylic acid.

Generally, the polymer substrate should contain 0.5 to 8% by weight of the phenolic complex to provide anti-microbial and mold inhibiting characteristics to the polymer. The antimicrobial composition is sufficient to inhibit black mold.

The compositions can be applied by dipping, spraying, brushing and as common in the trade by use alone or incorporated into a paint or polymer.

The amount of anti-microbial composition incorporated depends upon the utility and location of the polymer. About 1-8% by weight incorporated into the polymer as a coating is generally sufficient.

About 0.5 to 1% by weight of the phenol complex is sufficient to treat a patient with viral and/or bacterial infections.

The compositions of the invention can kill on contact bacteria such as MRSA, *C. Difficile, Staph aureas, salmonella, E. Coli,* influenza virus, SARS, and others.

The following example compositions are provided to illustrate the invention but are not to be considered to limit the invention. By way of example, a list of useful components and their sources is provided in Table 1.

TABLE 1

Commercially available sources of Components

| Ingredient | Product Identification | Source |
| --- | --- | --- |
| Vinylidene Fluoride - Tetra Fluoroethylene Copolymer | Kynar 7201 ® | Elf Atochn ATO Philadelphia, PA |
| Acrylic Copolymers | Rhoplex B-151 ® emulsion Acusol ® | Rohm and Haas Co. |
| Butylmethacrylate 2 Dimethylamino-ethyl Methacrylate and Methyl Methacrylate Acrylic Copolymer Epoxy resin | ® Eudragit E100 | Philadelphia, PA Hulls America, Inc. |

Eudragit and Kynar are suitable in preparing bandages.

EXAMPLE 1

The antimicrobial composition for use in incorporation into a polyurethane is prepared as follows:

| Ingredient | Wt. % |
| --- | --- |
| Chloroxylenol | 5.0 |
| Succinic acid | 2.5 |
| ADOGEN 572 ® | 2.5 |
| Solvent | q.s. |
| | 100% |

The solvent can be water, soy methyl ester, polyester or polyether polyol and the like depending on the polyurethane.

A cellulosic or polyurethane foam for use as a filter is placed into a bath containing the antimicrobial composition.

The foam is removed from the bath and excess solvent is squeezed from the foam. Upon drying or curing, the cells within the foam have a water insoluble antimicrobial coating and an internal antimicrobial.

For polyolefin foam PEG100-PEG1000 or vegetable oil may be used when incorporated into the polymer. Alternatively, the polymer can be sprayed and the activity will last for months. This being suitable for filters in cars and/or homes.

EXAMPLE 2

Following the procedure of U.S. Pat. No. 3,770,668 which is incorporated herein by reference, heat plastified polyethylene containing 2.0% by weight of dimethyl benzyl ammonium chloride and polyacrylic acid (1:1) is fed to an extruder at the rate of 541 parts by weight per hour. Blowing agents consisting of a 1:1 mixture of methyl bromide and dichlorodifluoromethane is injected into the mixture together with a concentrate of Example 1 with a vegetable oil solvent. The internealing studs of the mixer have a relative velocity of 100 feet per minute. A total feed of 20.3% 10–4 moles of blowing agent per gram of polymer is utilized. 0.06 parts of indigo per 100 parts of polymer is added as a nucleator a stable rectangular board is extruded.

The anti-microbial composition can be added by incorporating into the composition a microporous polypropylene homopolymer pellets such as sold under the trademark ACCUREL® by Membrana GMBH of Germany.

The foam can be used as insulation in automobile doors.

EXAMPLE 3

An antibacterial and anti-mold coating composition is prepared as follows:

| Ingredient | Wt. % |
| --- | --- |
| Chloroxylenol | 5.0 |
| Succinic acid | 2.5 |
| Diguanidine | 2.5 |
| Ethanol | 90 |

The composition can be used to spray parts of an anti-mold barrier and to prevent degradation by bacteria.

EXAMPLE 4

Anti-Mold Paint

A. An antimicrobial composition is prepared by admixing the following:

| Ingredient | Wt. % |
| --- | --- |
| Phenol | 15.0 |
| O-phenyl phenol | 5.0 |
| Succinic acid | 5.0 |
| ADOGEN 582 ® | 5.0 |
| Water | q.s. |
|  | 100% |

B. Into a quart container of Behr Premium Plus Exterior Flat White paint containing 100% acrylic latex is mixed 20 ml of the composition of Part A. The amount of water utilized can be reduced depending upon the paint utilized. Optionally, mineral oil based paint would require the use of a mineral or vegetable oil solvent in lieu of water.

Results

The paint when placed on a wood substrate and dried resisted the growth of black mold. The composition of Part A can be formed with an organic solvent for use in non-latex paints. About 1-5% of active is sufficient in most applications.

EXAMPLE 5

Prevention of Mold on Wood

A. A 2×3 ft. plank of green wood is coated with the composition of Example 1, dried, and black mold was placed on the surface.
   After 30 days the black mold was dead and the spores killed.
B. Following the procedure of Part A, green wood was treated with a composition and black mold and *aspergillis* were both killed.

EXAMPLE 6

The paint of Example 4 was brushed onto an untreated plywood board that contained *stachybotrys chartarium* that was inoculated into a growth medium.

The plywood was streaked by a swap after the paint was applied to the plywood for 24 hours and the same procedure was taken after 48 hours. The swabs were then streaked to a Potato Dextrose agar plate and incubated at 26° C. for seven days.

Results

The paint successfully inhibited *stachybotrys chartaium* and *trichoderma* spp. Which was present on the untreated plywood at 24 hours and 48 hours.

What is claimed is:

1. In combination a polymeric material and an antimicrobial composition which comprises chloroxylenol complexed with a member selected from the group consisting of an antimicrobial amine compound and a dicarboxylic acid having 2 to 8 carbon atoms, in a suitable solvent.

2. The composition of claim 1 wherein the dicarboxylic acid is succinic acid.

3. The composition of claim 1 which includes a member selected from the group consisting of phenol, and o-phenylphenol within the complex.

4. The combination of claim 1 wherein said polymeric material is polyurethane.

5. The combination of claim 1 wherein said polymeric material comprises paint.

6. The combination of claim 1 wherein said polymeric material is a polyolefin.

7. The combination of claim 1 wherein the polymeric material is a foam.

* * * * *